United States Patent [19]
Lordo et al.

[11] Patent Number: 4,839,547
[45] Date of Patent: Jun. 13, 1989

[54] MOTOR FRAME AND MOTOR WITH INCREASED COOLING CAPACITY

[75] Inventors: Robert E. Lordo, Forth Mill, S.C.; Walter E. Rudisch, Ft. Lauderdale, Fla.

[73] Assignee: Wertec Corporation, Pineville, N.C.

[21] Appl. No.: 174,228

[22] Filed: Mar. 28, 1988

[51] Int. Cl.[4] .................................. H02K 9/00
[52] U.S. Cl. ........................... 310/60 A; 310/64
[58] Field of Search ............... 310/52, 58, 59, 60 R, 310/60 A, 62, 63, 64, 216, 258

[56] References Cited

U.S. PATENT DOCUMENTS

| | | | |
|---|---|---|---|
| 2,783,398 | 2/1957 | Haas et al. | 310/57 |
| 3,047,754 | 7/1962 | Jaeschke | 310/59 |
| 3,531,668 | 9/1970 | Cathey | 310/58 |
| 4,103,192 | 7/1978 | Wendt et al. | 310/64 |
| 4,105,905 | 8/1978 | Barcus | 310/59 |
| 4,244,098 | 1/1981 | Barcus | 310/64 X |
| 4,415,824 | 11/1983 | Meier | 310/58 X |
| 4,742,257 | 5/1988 | Carpenter | 310/64 X |

FOREIGN PATENT DOCUMENTS 59-21250  2/1984  Japan ........................... 310/64

Primary Examiner—William M. Shoop, Jr.
Assistant Examiner—Marc S. Hoff
Attorney, Agent, or Firm—W. Thad Adams, III

[57] ABSTRACT

A frame for an electric machine characterized by increased cooling capacity. An integral frame member has a pre-determined length defined by outer walls and inner walls, the inner walls defining a through void within which to accommodate stationary and rotating parts of the machine. A multitude of closely spaced-apart outer fins are integrally-formed with and project outwardly from the outer walls of the frame member for convection cooling of the frame by fluid contact iwth the enlarged surface areas of the fins. A multitude of closely spaced-apart inner fins are integrally-formed with and project inwardly from the inner walls of the frame member into the void defined thereby for convection cooling of the frame and the stationary and rotating parts of the machine within the frame by convection cooling by fluid contact with the enlarged surface area of the fins. The innermost ends of the fins are adapted to support thereon the stationary parts of the machine.

18 Claims, 4 Drawing Sheets

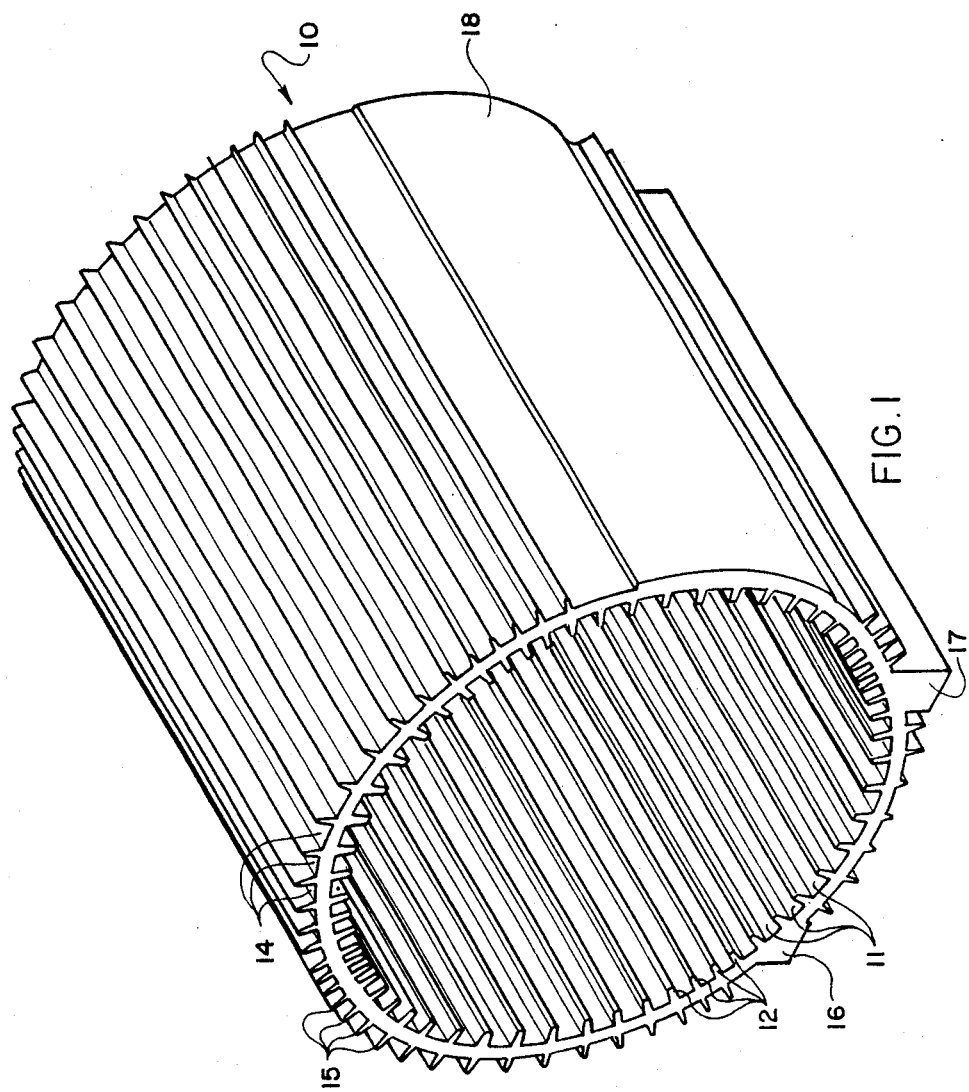

MOTOR FRAME AND MOTOR WITH INCREASED COOLING CAPACITY

TECHNICAL FIELD AND BACKGROUND OF THE INVENTION

This invention relates to a motor frame with increased cooling capacity and a motor constructed with such a frame. As is well known in the art, one of the factors limiting the operation of a motor is the ability of the physical structure of the motor and its enclosure to dissipate heat. Motors are rated based on their ability to operate in a continuous steady state at a given temperature below a maximum allowable temperature. These limitations are imposed not only to prevent premature wear and failure of the motor, but to prevent unsafe conditions resulting from extremely hot motor parts which could ignite adjacent materials.

Various techniques for dissipating heat are known, and include providing fins on the exterior of the motor frame. Heat dissipation is enhanced by the fins as a result of a greatly increased surface area in contact with the environment. Heat travels from the stator through the thickness of the frame at a given rate by conduction and radiates into the atmosphere from the surface of the exterior of the motor frame by convection and radiation. The fins permit the heat transfer rate to be increased.

The preferred embodiment of the invention disclosed below is shown on a brushless direct current motor which operates on alternating current. In the prior art version of this type of motor, a wound stator extends around the inside of the motor frame in intimate contact with the smooth, continuous, inner walls of the frame. A rotor onto which magnets are secured rotates within the void of the stator. Heat generated in the stator during operation of the motor is conducted through the solid walls of the motor frame and into the vicinity of the fins, where the heat radiates into the air by convection and radiation. The invention described below permits heat to be dissipated from the motor at a much greater rate, thereby permitting the motor to operate under more severe load and environmental conditions without detrimental effects.

The invention also permits the use of a single, extruded aluminum extrusion to build totally enclosed or open, externally ventilated motors. Motors that are totally enclosed, non-ventilated depend entirely on the removal of heat from the frame surface by natural convection and radiation. Motors that are totally enclosed, fan cooled or totally enclosed air-over rely heavily on the moving of forced air over the motor's exterior fins for improved heat dissipation. Motors having an open construction depend mainly on the moving of cool, outside, ambient air into the interior of the motor and over the hot stator windings, laminations, and then discharge the heated air out of the ventilation openings. The invention according to this application permits motors of both closed and open construction to be built using the same extrusion, and, in addition, provides enhanced cooling.

SUMMARY OF THE INVENTION

Therefore, it is an object of the invention to provide a motor frame and motor with increased cooling and ventilation capacity.

It is another object of the invention to provide a motor frame and motor which permits convective cooling to take place between the stator and the motor frame.

It is a further object of the invention to provide a motor frame and motor which permits a motor to operate under more severe conditions These and other objects of the present invention are achieved in the preferred embodiments disclosed below by providing a frame for an electric machine characterized by increased cooling capacity, and comprising an integral frame member having a predetermined length defined by outer walls and inner walls, the inner walls defining a through void within which to accommodate stationary and rotating parts of the machine.

A multitude of closely spaced-apart outer fins are integrally-formed with and project outwardly from the outer walls of the frame member for convection cooling of the frame by fluid contact with the enlarged surface area of the fins.

A multitude of closely spaced-apart inner fins are integrally-formed with and project inwardly from the inner walls of the frame member into the void defined thereby for convection and radiation cooling of the frame and the stationary and rotating parts of the machine within the frame by fluid contact with the enlarged surface area of the fins.

The innermost ends of the fins are adapted to support the stationary parts of the machine.

According to one preferred embodiment of the invention, the inner fins and outer fins extend axially along the length of the frame member.

According to another preferred embodiment of the invention, the frame member is substantially circular in cross-section and the inner fins and outer fins extend, respectively, radially inwardly and radially outwardly with respect to the circular cross-section of the frame member.

Preferably, each outer fin resides in radial alignment with a corresponding inner fin.

According to one preferred embodiment of the invention, the innermost end of the inner fin is flat or very slight concave for providing a relatively large surface area of support for the stationary parts of the machine.

According to another preferred embodiment of the invention, the inner fins project inwardly a distance less than the distance the outer fins project outwardly, and wherein the inner fins have a width greater than the outer fins.

According to one preferred embodiment of the invention, the frame member is circular in cross-section and adjacent ones of the inner and outer fins are typically spaced no less than 5 degrees of arc apart and the frame comprises extruded aluminum.

The motor according to the invention includes a frame comprising an integral frame member having a predetermined length defined by outer walls and inner walls, the inner walls defining a through void therein.

A multitude of closely spaced-apart outer fins are integrally-formed with and project outwardly from the outer walls of the frame member for convection cooling of the frame by fluid contact with the enlarged surface area of the fins.

A multitude of closely spaced-apart inner fins are integrally-formed with and project inwardly from the inner walls of the frame member into the void defined thereby for convection and/or radiation cooling of the frame and the stationary and rotating parts of the machine within the frame.

The innermost ends of the fins are adapted to support the stationary parts of the machine.

A wound stator is positioned within the frame and secured to the ends of the inner fins to define passageways for cooling air flow between adjacent inner fins.

A shaft having a magnetic rotor thereon is positioned within the frame and within the stator.

According to one preferred embodiment of the invention, the inner fins and outer fins extend axially along the length of the frame member.

According to another preferred embodiment of the invention, the frame member is substantially circular in cross-section and the inner fins and outer fins extend, respectively, radially inwardly and radially outwardly with respect to the circular cross-section of the frame member.

Preferably, each outer fin resides in radial alignment with a corresponding inner fin.

According to one preferred embodiment of the invention, the innermost end of the inner fin is flat for providing a relatively large surface area of support for the stationary parts of the machine.

According to another preferred embodiment of the invention, the inner fins project inwardly a distance less than the distance the outer fins project outwardly, and wherein the inner fins have a width greater than the outer fins.

According to one preferred embodiment of the invention, the frame member is circular in cross-section and adjacent ones of the inner and outer fins are typically spaced no less than 5 degrees of arc apart and the frame comprises extruded aluminum. The design can be used for any type of motor; for example, stepping, single phase and shaded pole motors.

BRIEF DESCRIPTION OF THE DRAWINGS

Some of the objects of the invention have been set forth above. Other objects and advantages of the invention will appear as the description of the invention proceeds when taken in conjunction with the following drawings, in which:

FIG. 1 is a perspective view of a motor frame according to the present invention;

DESCRIPTION OF THE PREFERRED EMBODIMENT

Figure 4:
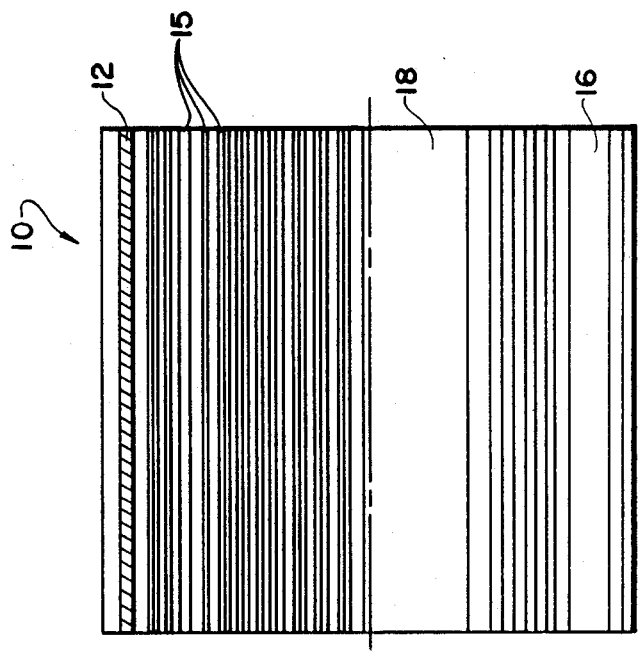
FIG. 4 is a partial cross-sectional view taken along line 4—4 of FIG. 2.

Referring now specifically to the drawings, a motor frame according to the present invention is illustrated in FIG. 1 and shown generally at reference numeral 10. The frame 10 is preferably fabricated in extruded aluminum. Frame 10 comprises an inner cylindrical wall 11 defined by spacing between a number of regularly-spaced, inwardly projecting and integrally formed fins 12. Each of the fins 12 extended inwardly along a radius determined by the spacing between each of the fins 12. Frame 10 also comprises an outer cylindrical wall 14 defined by spacing between a number of spaced-apart outwardly projecting and integrally formed fins 13. The inner wall 11 and the outer wall 14 are separated by the thickness of the frame 10.

As is shown in FIG. 1, the inner fins 12 are preferably regularly spaced around the entire inner periphery of the frame 10. However, this is not necessary and in irregular spacing could be used, especially if required to accommodate motor parts. The outer fins 15 are regularly spaced apart around most of the circumference of the frame 10. However, a pair of mountings 16 and 17 and an axially-extending smooth area 18 for mounting the motor nameplate, junction box, rating information and the like interrupt the regularity of the spacing. In the embodiment shown in FIG. 1, the inner and outer fins are spaced 6° apart except in the areas 16, 17 and 18 on the outer wall 14 devoid of fins. Therefore, there are 60 inner fins 12 and 45 outer fins 15. Of course, the number and arrangement of the fins is variable and may be more or less dependent on design requirements.

Figure 2:
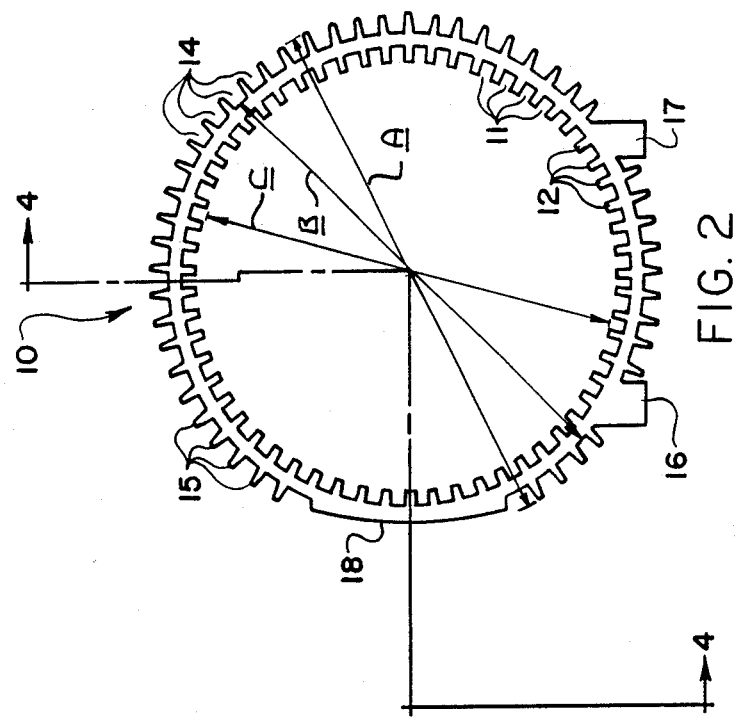
FIG. 2 is a vertical end cross-sectional view of the motor frame shown in FIG. 1.

Referring now to FIG. 2, it can be seen that 45 of the inner and outer fins 12 and 15 are in radial alignment with each other, the remaining 15 inner fins 12 residing in areas where there is not corresponding outer fins 15. In the illustrative embodiment shown in the drawings, the fin arrangement described above results in a structure with the three following diameters:

Diameter A: 9 inches
Diameter B: 8.42 inches
Diameter C: 7.42 inches

Figure 3:
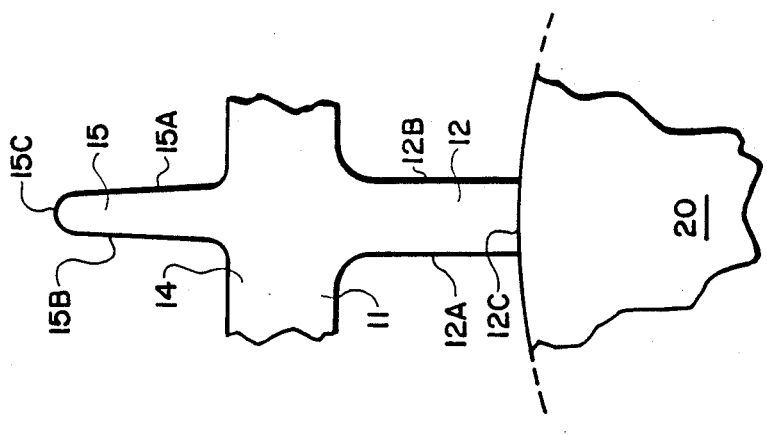
FIG. 3 is an enlarged fragmentary view of one of the fin groups shown in FIG. 2.

Referring now to FIG. 3, the structure of a single set of inner and outer fins 12 and 15 is illustrated in more detail. Each inner fin 12 has parallel side walls 12a, 12b, with a relatively flat or very slightly concave end 12c. The flat or concave end 12c provides a relatively large and secure mounting surface for the wound stator of the motor, as is described below. The outer fin has slightly tapered side walls 15a, 15b with a crowned end 15c. This shape reduces weight somewhat, provides efficient heat radiation and satisfies specific aluminum extrusion requirements. Note also that the base of the outer fin 15 is approximately 25% narrower than the base of the inner fin 12.

A partial cross-sectional view of frame 10 is shown in FIG. 4.

Figure 5:
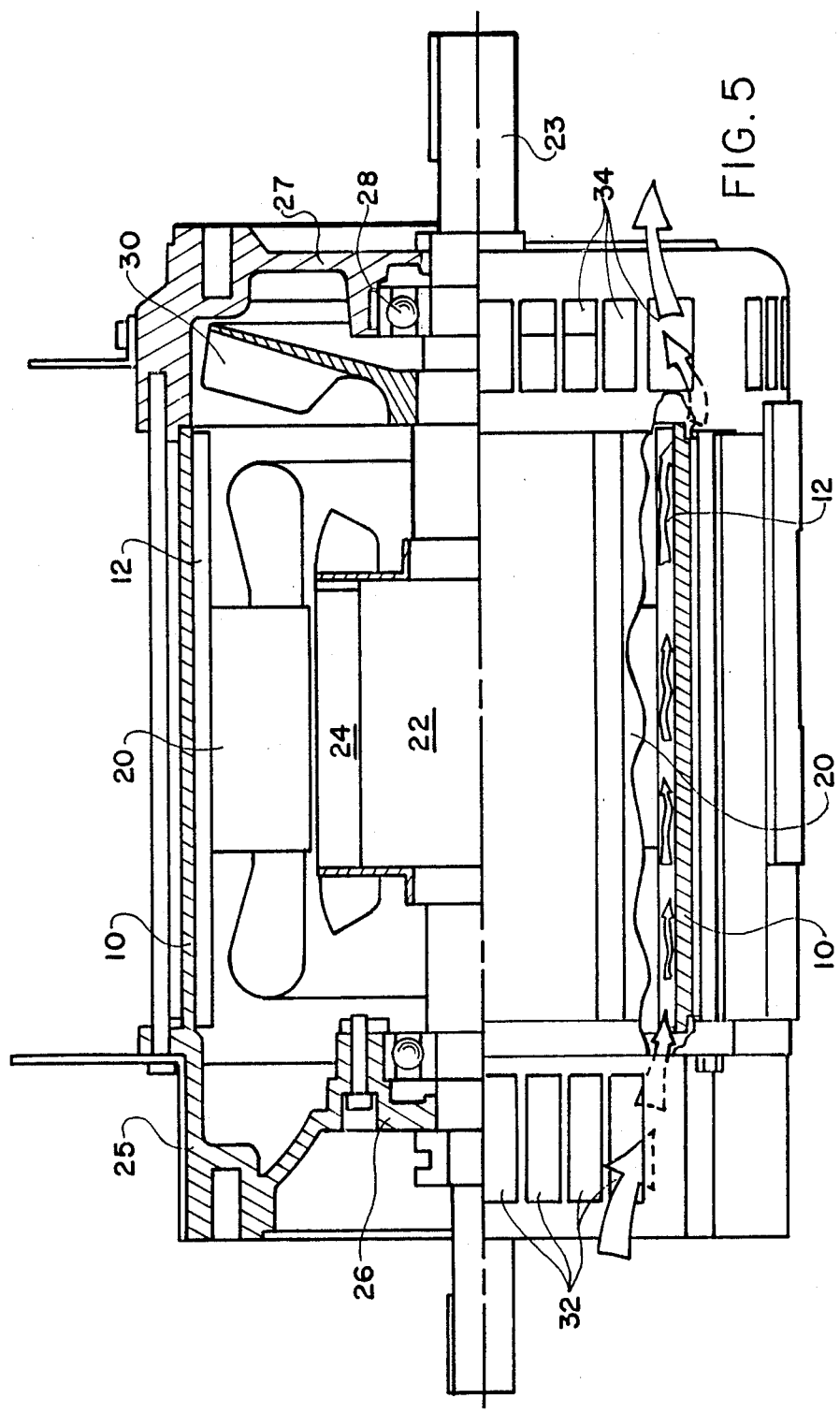
FIG. 5 is a partial vertical, longitudinal cross-section of a brushless DC motor utilizing the motor frame shown in FIGS. 1-4.

Referring now to FIG. 5, frame 10 is shown in the form of a brushless DC current electric motor which operates off of alternating current. A stator 20 with copper or aluminum windings 21 thereon are mounted by, for example, a tight interference fit onto the inner fins 12. See also FIG. 3. A rotor 22, comprising a shaft 23 onto which are mounted permanent magnets 24, is positioned in the void in frame 10 in closely spaced-apart rotating relation to stator 20. Frame 10 is closed on one end by a feedback end bracket 25 which includes a radially-inwardly extending bearing assembly 26 in which shaft 23 is mounted for rotation. The opposite end is closed by an end cap 27, also having a bearing assembly 28 in which shaft 23 is mounted for rotation. A fan 30 is mounted for rotation on shaft 23. The feedback end bracket 25 and end cap 27 have respective air flow openings 32 and 34. Fan 30 pulls air through openings 32 and along air flow channels defined by each of the spaces between the inner fins 12. Thus, with reference to FIG. 5, air is pulled through the interior of the motor from left to right by fan 30 and as it passes through each of the spaces between the inner fins 12, removes heat from the fins 12 and from the adjacent surfaces of the stator 20.

Figure 6:
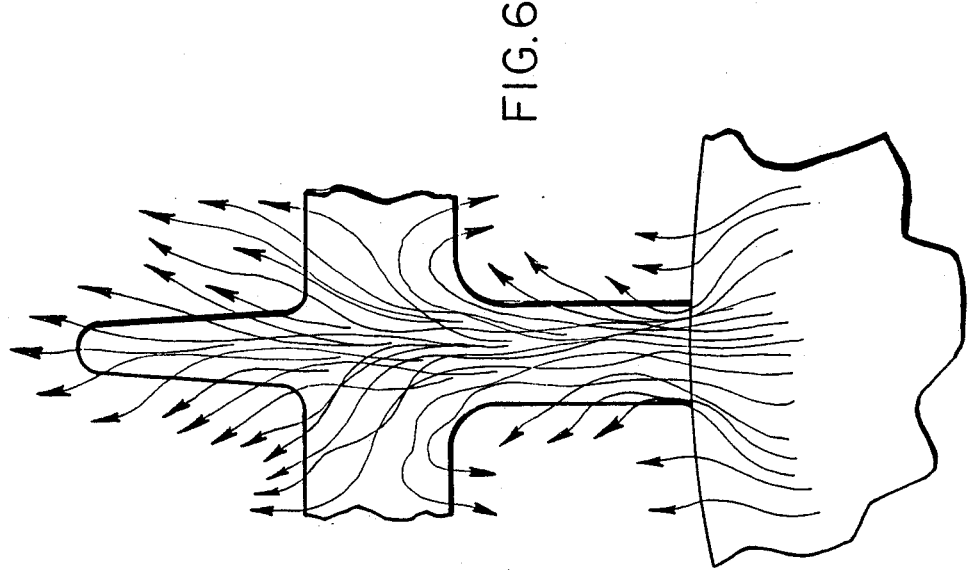
FIG. 6 is a diagrammatic view according to FIG. 3 showing heat dispersion patterns through a single inner and outer fin.

Referring now to FIG. 6, the heat dispersion pattern achieved by the structure described above is shown. As is apparent, a substantially larger surface area of the frame 10 itself is exposed to air flow. In addition, the channels defined by each of the spaces between inner fins 12 permit additional convection cooling as air is circulated down these channels from one end of the motor frame 10 to the other.

The structure of frame 10 permits the use of a single, extruded aluminum extrusion to build totally enclosed or open, externally ventilated motors. Motors that are totally enclosed, non-ventilated depend entirely on the removal of heat from the frame surface by natural convection and radiation. Motors that are totally enclosed, fan cooled or totally enclosed "air-over" rely heavily on the movement of forced air over the motor's exterior fins for improved heat dissipation. Motors such as the one shown in the drawing having an open construction depend mainly on the moving of cool, outside, ambient air into the interior of the motor and over the hot stator windings, laminations, and then discharge the heated air out of the ventilation openings.

A motor frame with increased cooling capacity and a motor constructed with such a frame is described above. Various details of the invention may be changed without departing from its scope. Furthermore, the foregoing description of the preferred embodiment according to the present invention is provided for the purpose of illustration only and not for the purpose of limitation—the invention being defined by the claims.

I claim:

1. A frame for an electric machine characterized by increased cooling capacity, and comprising:
   (a) an integral frame member having a pre-determined length defined by outer walls and inner walls, said inner walls defining a through void within which to accommodate stationary and rotating parts of the machine;
   (b) a multitude of closely spaced-apart outer fins integrally-formed with and projecting outwardly from the outer walls of said frame member for convection cooling of the frame by fluid contact with the enlarged surface area of the fins; and
   (c) a multitude of closely spaced-apart inner fins integrally-formed with and projecting inwardly from the inner walls of said frame member into the void defined thereby for, the innermost ends of said fins adapted to support thereon the stationary parts of the machine, and being flat for providing a relatively large surface area of support for the stationary parts of the machine.

2. A frame for an electric machine characterized by increased cooling capacity, and comprising:
   (a) an integral frame member having a pre-determined length defined by outer walls and inner walls, said inner walls defining a through void within which to accommodate stationary and rotating parts of the machine;
   (b) a multitude of closely spaced-apart outer fins integrally-formed with and projecting outwardly from the outer walls of said frame member for convection cooling of the frame by fluid contact with the enlarged surface area of the fins; and
   (c) a multitude of closely spaced-apart inner fins integrally-formed with and projecting inwardly from the inner walls of said frame member into the void defined thereby for, the innermost ends of said fins adapted to support thereon the stationary parts of the machine, and project inwardly a distance less than the distance the outer fins project outwardly, and wherein said inner fins have a width greater than said outer fins.

3. A frame for an electric machine according to claim 1 or 2, wherein said inner fins and outer fins extend axially along the length of the frame member.

4. A frame for an electric machine according to claim 1 or 2, wherein said frame member is substantially circular in cross-section and said inner fins and outer fins extend, respectively, radially inwardly and radially outwardly with respect to the circular cross-section of said frame member.

5. A frame for an electric machine according to claim 1 or claim 2, wherein each outer fin resides in radial alignment with a corresponding inner fin.

6. A frame for an electric machine according to claim 1 or claim 2, wherein said frame member is circular in cross-section and adjacent ones of said inner and outer fins are spaced no less than 5 degrees of arc apart.

7. A frame for an electric machine according to claim 1 or claim 2, wherein said frame comprises extruded aluminum.

8. An electric machine characterized by increased cooling capacity, and comprising:
   (a) a frame comprising an integral frame member having a predetermined length defined by outer walls and inner walls, said inner walls defining a through void therein; a multitude of closely spaced-apart outer fins integrally-formed with and projecting outwardly from the outer walls of said frame member for convection cooling of the frame by fluid contact with the enlarged surface area of the fins; and a multitude of closely spaced-apart inner fins integrally-formed with and projecting inwardly from the inner walls of said frame member into the void defined thereby for convection and/or radiation cooling of the frame and the stationary and rotating parts of the machine within the frame, the innermost ends of said inner fins adapted to support thereon the stationary parts of the machine;
   (b) a wound stator positioned within said frame and secured to the ends of said inner fins to define passageways for cooling fluid flow between adjacent inner fins; and
   (c) a shaft having a magnetic rotor thereon positioned within said frame and within said stator, and being flat for providing a relatively large surface area of support for the stationary parts of the machine.

9. An electric machine characterized by increased cooling capacity, and comprising:
   (a) a frame comprising an integral frame member having a predetermined length defined by outer walls and inner walls, said inner walls defining a through void therein; a multitude of closely spaced-apart outer fins integrally-formed with and projecting outwardly from the outer walls of said frame member for convection cooling of the frame by fluid contact with the enlarged surface area of the fins; and a multitude of closely spaced-apart inner fins integrally-formed with and projecting inwardly from the inner walls of said frame member into the void defined thereby for convection and/or radiation cooling of the frame and the stationary and rotating parts of the machine within the frame, the innermost ends of said inner fins adapted to support thereon the stationary parts of the machine;

(b) a wound stator positioned within said frame and secured to the ends of said inner fins to define passageways for cooling fluid flow between adjacent inner fins; and (c) a shaft having a magnetic rotor thereon positioned within said frame and within said stator, and project inwardly a distance less than the distance the outer fins project outwardly, and wherein said inner fins have a width greater than said outer fins.

10. An electric machine according to claim 8 or claim 9, wherein said inner fins and outer fins extend axially along the length of the frame member.

11. An electric machine according to claim 8 or claim 9, wherein said frame member is substantially circular in cross-section and said inner fins and outer fins extend, respectively, radially inwardly and radially outwardly with respect to the circular cross-section of said frame member.

12. An electric machine according to claim 8 or claim 9, wherein each outer fin resides in radial alignment with a corresponding inner fin.

13. An electric machine according to claim 8 or claim 9, wherein said frame member is circular in cross-section and adjacent ones of said inner and outer fins are spaced no less than 5 degrees of arc apart.

14. An electric machine according to claim 8 or claim 9, wherein said frame comprises extruded aluminum.

15. An electric machine characterized by increased cooling capacity, and comprising:

(a) an extruded cylindrical frame comprising an integral frame member having a pre-determined length defined by outer walls and inner walls, said inner walls defining a through void therein; a multitude of closely spaced-apart, outer fins integrally-formed with and projecting radially outwardly from the outer walls of said frame member for convection cooling of the frame by fluid contact with the enlarged surface area of the fins; and a multitude of closely spaced-apart inner fins integrally-formed with and projecting radially inwardly from the inner walls of said frame member in radial alignment with said outer fins into the void defined thereby for convection cooling of the frame and the stationary and rotating parts of the machine within the frame by fluid contact with the enlarged surface area of the fins, the innermost ends of said inner fins adapted to support thereon the stationary parts of the machine;

(b) a wound stator positioned within said frame and secured to the ends of said inner fins to define passageways for cooling air flow between adjacent inner fins; and (c) a shaft and a magnetic rotor mounted on said shaft positioned within said frame and within said stator, and being flat for providing a relatively large surface area of support for the stationary parts of the machine.

16. An electric machine characterized by increased cooling capacity, and comprising:

(a) an extruded cylindrical frame comprising an integral frame member having a pre-determined length defined by outer walls and inner walls, said inner walls defining a through void therein; a multitude of closely spaced-apart, outer fins integrally-formed with and projecting radially outwardly from the outer walls of said frame member for convection cooling of the frame by fluid contact with the enlarged surface area of the fins; and a multitude of closely spaced-apart inner fins integrally-formed with and projecting radially inwardly from the inner walls of said frame member in radial alignment with said outer fins into the void defined thereby for convection cooling of the frame and the stationary and rotating parts of the machine within the frame by fluid contact with the enlarged surface area of the fins, the innermost ends of said inner fins adapted to support thereon the stationary parts of the machine;

(b) a wound stator positioned within said frame and secured to the ends of said inner fins to define passageways for cooling air flow between adjacent inner fins; and (c) a shaft and a magnetic rotor mounted on said shaft positioned within said frame and within said stator, and project inwardly a distance less than the distance the outer fins project outwardly, and wherein said inner fins have a width greater than said outer fins.

17. An electric machine according to claim 15 or claim 16 wherein the adjacent ones of said inner and outer fins are spaced no less than 5 degrees of arc apart.

18. An electric machine according to claim 15 or claim 16, and including forced air ventilation means mounted within said extrusion for directing air over said inner fins.

* * * * *